United States Patent [19]
Chupp

[11] 3,887,356
[45] June 3, 1975

[54] HERBICIDAL COMPOSITIONS AND METHODS EMPLOYING N-(1-CYCLOALKEN-1-YL)-AMINO-S-TRIAZINE

[75] Inventor: John P. Chupp, Kirkwood, Mo.

[73] Assignee: Monsanto Company, St. Louis, Mo.

[22] Filed: June 17, 1974

[21] Appl. No.: 480,183

Related U.S. Application Data

[60] Continuation of Ser. No. 297,109, Oct. 12, 1972, abandoned, which is a division of Ser. No. 127,625, March 24, 1971, Pat. No. 3,714,162.

[52] U.S. Cl. .......................... 71/93; 71/92
[51] Int. Cl. ............................. A01m 9/22
[58] Field of Search ......................... 71/93

[56] References Cited
UNITED STATES PATENTS

3,628,943  12/1971  Gullfeldt ................. 71/93
3,629,257  12/1971  Berrer et al. ............ 71/93

*Primary Examiner*—James O. Thomas, Jr.
*Attorney, Agent, or Firm*—William T. Black

[57] ABSTRACT

Compounds of the formula

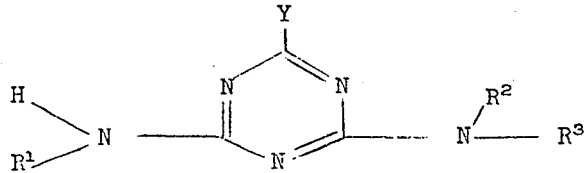

where
Y represents chloro, alkoxy or alkylthio of a maximum of 4 carbon atoms;
$R^1$ represents alkyl, or alkoxyalkyl containing from 1 to 8 carbon atoms;
$R^2$ represents alkyl containing from 1 to 8 carbon atoms with the provision that the sum of the carbon atoms in $R^1$ and $R^2$ is from 4 to 10 and $R^3$ is a 1-cyclopenten-1-yl, a 1-cyclohexen-1-yl, a 1-cyclohepten-1-yl, or a lower alkyl or lower alkoxy substituted 1-cyclopenten-1-yl, 1-cyclohexen-1-yl, or 1-cyclohepten-1-yl group.

These compounds are useful as herbicides.

23 Claims, No Drawings

HERBICIDAL COMPOSITIONS AND METHODS EMPLOYING N-(1-CYCLOALKEN-1-YL)-AMINO-S-TRIAZINE

This is a continuation of application Ser. No. 297,109, filed Oct. 12, 1972, now abandoned, which is a division of application Ser. No. 127,625, filed Mar. 24, 1971, now U.S. Pat. No. 3,714,162.

The present invention relates to new chemical compound, to herbicidal compositions containing same and to the related method of controlling the growth of plants. More particularly, it has been found that certain novel N-(1-cycloalken-1-yl)amino-s-triazines exhibit herbicidal activity.

The novel N-(1-cycloalken-1-yl)-s-triazine compound of this invention are those represented by the formula

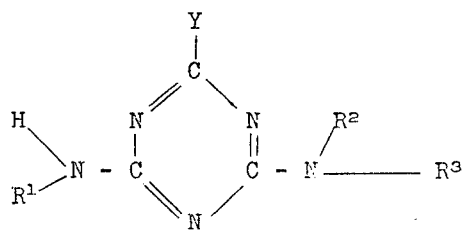

wherein Y is chloro, alkoxy or alkylthio containing up to 4 carbon atoms; $R^1$ is alkyl or alkoxyalkyl containing a maximum of 8 carbon atoms, $R^2$ is alkyl containing from 1 to 8 carbon atoms provided that the sum of the carbon atoms in the groups represented by $R^1$ and $R^2$ is at least 4 and $R^3$ is a 1-cyclopenten-1-yl, a 1-cyclohexen-1-yl, a 1-cyclohepten-1-yl or a lower alkyl or lower alkoxy substituted 1-cyclopenten-1-yl, 1-cyclohexen-1-yl, or 1-cyclohepten-1-yl group.

Illustrative of the alkyl groups represented by $R^1$ and $R^2$ as substituents in the cycloalkenyl group, are, for example, methyl, ethyl, propyl, isopropyl, butyl, sec-butyl, t-butyl, pentyl, hexyl octyl, isooctyl and the like. Illustrative of the alkoxyalkyl groups represented by $R^1$ are, for example, methoxymethyl, methoxyethyl, propoxypropyl, propoxybutyl, butoxybutyl, butoxyethyl and the like. Illustrative of the alkoxy and alkylthio groups represented by Y are, for example, methoxy, methylthio, ethoxy, ethylthio, propoxy, propylthio, butoxy, butylthio and their isomers. Illustrative of the alkoxy groups which may be attached to the cycloalkenyl group are methoxy, ethoxy, propoxy, butoxy and the like.

The particularly preferred compounds of this invention are

Compounds of the formula

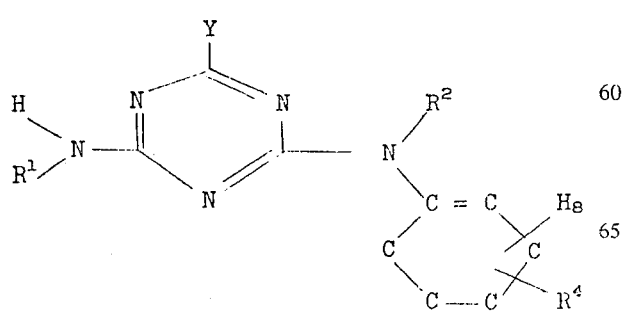

wherein Y, $R^1$ and $R^2$ are as above defined, and $R^4$ is hydrogen, a lower alkyl or lower alkoxy group.

Illustrative of the compounds within the scope of the invention are:

2-methylamino-4-[N-propyl-N-(1-cyclohexen-1-yl)]amino-6-chloro-s-triazine 2-ethylamino-4-[N-butyl-N-(1-cyclohexen-1-yl)]amino-6-chloro-s-triazine 2-methylamino-4-[N-isopropyl-N-(1-cyclohexen-1-yl)]-amino-6-methylthio-s-triazine 2-ethylamino-4-[N-ethyl-N-(1-cyclohexen-1-yl)]amino-6-methylthio-s-triazine 2-ethylamino-4-[N-ethyl-N-(1-cyclohexen-1-yl)]amino-6-ethylthio-s-triazine 2-ethylamino-4-[N-isopropyl-N-(1-cyclohexen-1-yl)]-amino-6-methylthio-s-triazine 2-isopropylamino-4-[N-methyl-N-(1-cyclohexen-1-yl)]-amino-6-methylthio-s-triazine 2-isopropylamino-4-[N-ethyl-N-(1-cyclohexen-1-yl)]-amino-6-methylthio-s-triazine 2-isopropylamino-4-[N-isopropyl-N-(1-cyclohexen-1-yl)]-amino-6-methylthio-s-triazine 2-butylamino-4-[N-ethyl-N-(1-cyclohexen-1-yl)]-amino-6-methylthio-s-triazine 2-t-butylamino-4-[N-methyl-N-(1-cyclohexen-1-yl)]-amino-6-methylthio-s-triazine 2-ethylamino-4-[N-t-butyl-N-(1-cyclohexen-1-yl)]-amino-6-methylthio-s-triazine 2-ethylamino-4-[N-ethyl-N-(1-cyclohexen-1-yl)]-amino-6-ethylthio-s-triazine 2-ethylamino-4-[N-ethyl-N-(1-cyclohexen-1-yl)]-amino-6-propylthio-s-triazine 2-methylamino-4-[N-propyl-N-(1-cyclohexen-1-yl)]-amino-6-chloro-s-triazine 2-ethylamino-4-[N-ethyl-N-(1-cyclohexen-1-yl)]-amino-6-chloro-s-triazine 2-methylamino-4-[N-isopropyl-N-(1-cyclohexen-1-yl)]-amino-6-chloro-s-triazine 2-ethylamino-4-[N-butyl-N-(1-cyclopenten-1-yl)]-amino-6-chloro-s-triazine 2-methylamino-4-[N-isopropyl-N-(1-cyclohepten-1-yl)]-amino-6-methoxy-s-triazine 2-ethylamino-4-[N-ethyl-N-(1-cyclohepten-1-yl)]-amino-6-methoxy-s-triazine 2-ethylamino-4-[N-ethyl-N-(1-cyclopenten-1-yl)]-amino-6-ethylthio-s-triazine 2-ethylamino-4-[N-isopropyl-N-(1-cyclohepten-1-yl)]-amino-6-methylthio-s-triazine 2-isopropylamino-4-[N-methyl-N-(1-cyclohepten-1-yl)]-amino-6-methylthio-s-triazine 2-isopropylamino-4-[N-ethyl-N-(1-cyclopenten-1-yl)]-amino-6-methylthio-s-triazine 2-isopropylamino-4-[N-isopropyl-N-(1-cyclohepten-1-yl)]-amino-6-methylthio-s-triazine 2-butylamino-4-[N-ethyl-N-(1-cyclopenten-1-yl)]-amino-6-methylthio-s-triazine 2-t-butylamino-4-[N-methyl-N-(1-cyclohepten-1-yl)]-amino-6-methylthio-s-triazine 2-ethylamino-4-[N-t-butyl-N-(1-cyclopenten-1-yl)]-amino-6-methylthio-s-triazine 2-ethylamino-4-[N-ethyl-N-(1-cyclopenten-1-yl)]-amino-6-ethylthio-s-triazine N-ethylamino-4-[N-ethyl-N-(1-cyclohepten-1-yl)]-amino-6-propylthio-s-triazine 2-methylamino-4-[N-propyl-N-(1-cyclohepten-1-yl)]-amino-6-chloro-s-triazine 2-ethylamino-4-[N-ethyl-N-(1-cyclohepten-1-yl)]-amino-6-chloro-s-triazine 2-methylamino-4-[N-isopropyl-N-(1-cyclopenten-1-yl)]-amino-6-chloro-s-triazine 2-ethylamino-4-[N-ethyl-N-(1-cyclohexen-1-yl)]-amino-6-methoxy-s-triazine 2-ethylamino-4-[N-propyl-N-(1-cyclohexen-1-yl)]-amino-6-methoxy-s-triazine 2-ethylamino-4-[N-isopropyl-N-(1-cyclohexen-1-yl)]-amino-6-chloro-s-triazine 2-isopropylamino-4-[N-methyl-N-(1-cyclohexen-1-yl)]-amino-6-chloro-s-triazine 2-isopropylamino-4-[N-ethyl-N-(1-cyclohexen-1-yl)]-amino-6-chloro-s-triazine 2-isopropylamino-4-[N-isopropyl-N-(1-cyclohexen-1-yl)]-amino-6-chloro-s-triazine 2-butylamino-4-[N-ethyl-N-(1-cyclohexen-1-yl)]-amino-6-chloro-s-triazine 2-t-butylamino-4-[N-ethyl-N-(1-cyclohexen-1-yl)]-amino-6-chloro-s-triazine 2-ethylamino-4-[N-t-butyl-N-(1-cyclohexen-1-yl)]-amino-6-chloro-s-triazine 2-isopropylamino-4-[N-ethyl-N-(1-cyclohexen-1-yl)]-amino-6-methoxy-s-triazine 2-ethoxymethylamino-4-[N-ethyl-N-(1-cyclohexen-1-yl)]-amino-6-methoxy-s-triazine The "1-cycloalken-1-yl" compounds of this invention can be prepared by the following reaction sequence:

1. The reaction of cyanuric chloride and an N-alkyl-N-cycloalkylodene amine to form a 2,6-dichloro-4-[N-alkyl-N-(1-cycloalken-1-yl)]-amino-s-triazine.

2. The above product is then reacted with an alkylamine corresponding to the desired alkylamino substituent to form the 2-alkylamino-4-[N-alkyl-N-(1-cycloalken-1-yl)]-amino-6-chloro-s-triazine.

3. The corresponding 2 or 6-methylthio or methoxy-s-triazine is prepared by reacting the 2 or 6-chloro-s-triazine compound with an alkali metal salt of alkyl mercaptans, for example, $KSCH_3$ or with an alkali metal alkoxide when the alkoxy group is desired. The first step in the foregoing sequence is novel in triazine chemistry, whereas the other two steps are well known in the art. Accordingly, the first step will be discussed with more particularity.

The first step is to be carried out in a solvent which can be any dry inert organic solvent but preferably the solvent is one of the foregoing character which in addition is polar enough to dissolve the cyanuric chloride.

Because reaction of only one chlorine of the cyanuric chloride molecule with one imine molecule is desired, initially a temperature below about 30°C and more preferably below about 25°C is employed in this step. However, a temperature below about −25°C is usually not preferred. The most preferred initial temperature is in the range of about 0° to 10°C. To insure complete removal of the hydrogen chloride formed by the reaction after the reaction is initiated it is preferred to allow the temperature to rise to be above about 35°C. It is preferred to increase the temperature to be in the range of about 60° to 110°C. The precise temperature within this latter range usually is determined by the boiling point of the reaction solvent because refluxing the reaction mixture at atmospheric pressure is a highly satisfactory manner of carrying out the finishing step for HCL removal and illustrates the novelty of the reaction inasmuch as aliphatic amines normally cannot be substituted without employing an excess of the amines to accept the HCL liberated. Pressures other than atmospheric and means of removing HCL other than by refluxing the mixture can, of course, be employed but are generally less preferred than refluxing the reaction mixture at atmospheric pressure.

In the second reaction step slightly higher temperatures are to be employed than in step (1), however, the initial temperature of the second step should be kept below about 45°C in order to again limit reaction to one chlorine on the original cyanuric chloride ring which is now the triazine ring in the product of step (1). Preferred temperatures are about 10°C to 35°C. The solvent to be employed has the same general characteristics as in step (1) but the triazine reactant is slightly more soluble and therefore the preferred group of solvents is larger and includes, for example, diethyl ether, dioxane, tetrahydrofuran and the like.

The third step is an optional step and is to be carried out only in cases wherein Y is to be an alkylthio group or an alkoxy in the structures claimed herein. This reaction is able to be carried out at still higher temperatures than employed for the previous steps because completeness of reaction is desired. The preferred temperatures for initiating this reaction are above room temperature and preferably are about 60° to 100°C.

The term "herbicide" as used herein and in the appended claims means materials which control the growth of plants either (1) all plants in a given locus or (2) selectively control the growth of one or more plant species in the presence of other plants. In like manner, herbicidal is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "herbicidal formulation or composition" as used herein means a N-(1-cycloalken-1-yl)-amino-s-triazine of this invention in combination with one or more adjuvants to be defined hereinbelow.

The following examples serve to further illustrate the invention. All parts are parts by weight unless otherwise expressly set forth.

EXAMPLE 1

Cyanuric chloride (0.225 mol, 41.5 g.) was charged into a 500 ml 4-necked flask and about 150 ml of tetrahydrofuran added. The temperature of the mixture was maintained at 0°–5°C by means of external ice/acetone cooling N-methyl-N-cyclohexylidene amine (0.225 mol, 25 g.) was added dropwise with stirring. The solution turned yellow and a precipitate formed during the addition. Triethyl amine was then added dropwise and the reaction mixture stirred at 0°–5°C for an hour and was then allowed to warm to room temperature with stirring. The precipitate was removed by filtration and the solvent removed by vacuum evaporation leaving a red viscous liquid. This liquid was dissolved in pentane and eluted through a Florisil packed column with additional pentane. The pentane was then removed by vacuum evaporation and the solid remaining recrystallized from pentane. The solid was identified as 4,6-Dichloro-2[N-methyl-N-(1-cyclohexen-1-yl)]-amino-s-triazine.

The crystalline 4,6-Dichloro-2[N-methyl-N-(1-cylcohexen-1-yl)]-amino-s-triazine (0.35 mol, 9.1 g.) was dissolved in diethyl ether and charged into a 4-necked 500 ml round bottom flask. Isopropyl amine (0.07 mol, 4.15 g.) was added dropwise with stirring and the mixture heated to reflux. After refluxing for 45 minutes, the material was allowed to cool and stand overnight. The salt was filtered off and the filtrate washed once with water and then dried over magnesium sulfate. The magnesium sulfate was removed by filtration and the solvent removed by vacuum evaporation yielding crude 2-Chloro-4-(isopropylamino)-6-[N-methyl-N-(1-cyclohexen-1-yl)-amino]-s-triazine which was recrystallized from cold hexane. The 2-Chloro-4-(isopropylamino)-6-[N-methyl-N-(1-cyclohexen-1-yl)-amino]-s-triazine (I) was identified by elemental analysis and nuclear magnetic resonance spectral analysis and had a melting point of 86°–106°C.

According to the procedure described in Example 1, but employing the appropriate N-alkyl-N-cyclohexylidene amine in the first step and the appropriate alkyl amine in the second step, the following Compounds were prepared:

II. 2-Chloro-4-[N-(1-cyclohexen-1-yl)-N-ethyl]-amino-6-(isopropylamino)-s-triazine
Melting Point: 90°–125°C
III. 2-Chloro-4-(ethylamino)-6-[N-ethyl-N-(1-cyclohexen-1-yl)]-amino-s-triazine
Melting Point: 100°–138°C.
IV. 2-Chloro-4-(3-methoxypropylamino)-6-[N-(1-cyclohexen-1-yl)-N-methyl]-amino-s-triazine
Melting Point: 75°–113°C
V. 2-Chloro-4-(tert-butylamino)-6-[N-(1-cyclohexen-1-yl)-N-ethyl]-amino-s-triazine
Melting Point: 85°–105°C An alternate method of producing a 4,6-Dichloro-[N-alkyl-N-(1-cyclohexen-1-yl)]-amino-s-triazine is as follows:

Cyanuric chloride (40.5 grams, 0.22 mol) was dissolved in about 250 ml of dioxane in a 500 ml 4-necked flask. The solution was cooled to 0° to 5°C by means of an ice-acetone bath and N-ethylcyclohexylidene was added slowly with stirring. After the addition was complete the mixture was heated gradually to reflux temperature and refluxed for three hours to drive off the hydrogen chloride. The reaction mixture was allowed to cool to room temperature and the dioxane evaporated off under reduced pressure. The residue was refluxed with pentane. The resulting filtered pentane solution was evaporated to yield 49 g. of a solid (m.p. 77°–85°) which was identified as 4,6-Dichloro-N-ethyl-N-(1-cyclohexen-1-yl)-amino-s-triazine.

EXAMPLE 2

The 2-Chloro-4-(isopropylamino)-6-[N-methyl-N-(1-cyclohexen-1-yl)]-amino-s-triazine (3g.) prepared in Example 1 was charged into a 500 ml round bottom flask and an excess of sodium methoxide in methanol was added. The mixture was refluxed for approximately 1½ hours at approximately 65°C and then allowed to stand overnight. The mixture was then filtered and the methanol removed from the filtrate by vacuum evaporation. The residue was dissolved in diethyl ether, washed 3 times with water and dried over magnesium sulfate. The magnesium sulfate was then removed by filtration and the ether removed by evaporation to yield a solid which could be recrystallized from hexane. This solid was identified as 2-Isopropylamino-4-[N-methyl-N-(1-cyclohexen-1-yl)]-amino-6-methoxy-s-triazine (VI) by nuclear magnetic resonance spectral analysis and elemental analysis and had a melting point of 119° to 123°C.

According to the procedure described in Example 2, employing the appropriate chloro triazine starting materials and sodium methoxide the following compounds were prepared:

VII. 2-(tert-Butylamino)-4-[N-(1-cyclohexen-1-yl)-N-ethyl]-amino-6-methoxy-s-triazine (gum)
VIII. 2-[N-(1-Cyclohexen-1-yl)-N-methyl]-amino-4-methoxy-6-(3-methoxypropylamino)-s-triazine
Melting Point: 55°–72°C
IX. 2-(Ethylamino)-4-[N-(1-cyclohexen-1-yl)-N-ethyl]-amino-6-methoxy-s-triazine
Melting Point: 103°–105°C
X. 2-[N-(1-cyclohexen-1-yl)-N-ethyl]-amino-4-(isopropylamino)-6-methoxy-s-triazine
Melting Point: 83°–85°C

EXAMPLE 3

2-Chloro-4-(isopropylamino)-6-[N-methyl-N-(1-cyclohexen-1-yl)]-amino-s-triazine (3.4 g., 0.0121 mol) was dissolved in tertiary-butanol in a 250 ml round bottom flask and to this was added a solution of potassium tertiary butoxide (0.015 mol, 1.7 g.) in tertiary butanol, that had been previously sparged with an excess of methylmercaptan. The mixture was then refluxed for 3 hours, filtered and the filtrate vacuum evaporated to remove the solvent. The residue was dissolved in ether, washed 3 times with water and dried over magnesium sulfate. The magnesium sulfate was removed by filtration and the solvent evaporated off leaving a residue which melted at from 30° to 83°C and was identified as 2-(isopropylamino)-4-[N-methyl-N-(1-cyclohexen-1-yl)]-amino-6-(methylthio)-s-triazine (XI) which had the following analysis:

| | | | | | |
|---|---|---|---|---|---|
| Calc'd: | C, | 57.3% | H, | 7.90%; | N, 23.87%. |
| Found: | C, | 55.62%; | H, | 7.91%; | N, 22.32%. |

According to the procedure described in Example 3, employing the appropriate chloro triazine starting materials and sodium methylmercaptide, the following compounds were prepared:

XII. 2-[N-Methyl-N-(1-cyclohexen-1-yl)]-amino-4-(3-methoxypropylamino)-6-(methylthio)-s-triazine
Melting Point: 27°–85°C
XIII. 2-(Ethylamino)-4-[N-(1-cyclohexen-1-yl)-N-ethyl]-amino-6-(methylthio)-s-triazine
Melting Point: 84°–116°C
XIV. 2-[N-Ethyl-N-(1-cyclohexen-1-yl)]-amino-4-(isopropylamino)-6-(methylthio)-s-triazine

EXAMPLE 4

The pre-emergent herbicidal activity of the active ingredients of this invention is demonstrated by the incorporation method as follows: A good grade of top soil is placed in aluminum pans and compacted to a depth of three-eighths to one-half inch from the top of each pan. A predetermined number of seeds or plant propagules of the test plant species are placed on top of the soil in the pans. The seeds and plant propagules are covered with a three-eighths inch layer of soil which has been premixed with a herbicidal formulation containing a sufficient amount of active ingredient to obtain the desired rate of active ingredient per acre, and the pan leveled.

The planted pans are placed on a sand bench and maintained under ordinary conditions of sunlight and watering. The plants are observed at the end of approximately 14 days and the results recorded. The herbicidal activity index is based on the average percent control of each seed lot. The herbicidal activity index is converted to a relative numerical scale for the sake of brevity and simplicity in the table.

The pre-emergent herbicidal activity index used is defined as follows:

| Average % Control | Numerical Scale |
|---|---|
| 0–25 | 0 |
| 26–50 | 1 |
| 51–75 | 2 |
| 76–100 | 3 |

In Table I below, the dosage rate, the spectrum of the plants treated, and the results of tests carried out according to the above procedure are indicated for several of the compounds of this invention.

EXAMPLE 5

In a post-emergent herbicidal test, the active ingredients in each case are applied in spray form to 14-day or 21-day old specimens of the plants (species indicated hereinafter). The herbicidal sprays are acetone-water solutions containing surface active agent and varying amounts of the active ingredient. The solutions are applied to the plants in different pans at rates equal to the desired rate of active ingredient on a per acre basis. The treated plants are placed in a greenhouse and the effects are observed and recorded after approximately 14 days.

The post-emergent herbicidal activity index used in this example is defined as follows:

| Numerical Scale | Herbicidal Activity |
|---|---|
| 0 | No phytotoxicity |
| 1 | Slight phytotoxicity |
| 2 | Moderate phytotoxicity |
| 3 | Severe phytotoxicity |
| 4 | Plants dead |

In Table II the dosage rate, the spectrum of plants treated, the age of the plants, and the results carried out according to the above procedure are indicated for illustrative compounds of this invention.

TABLE I

| Compound No. | Conc lb/Acre | Canada Thistle | Cocklebur | Velvet Leaf | Morning Glory | Lambs-quarter | Smart-weed | Nut-sedge | Quack-grass | Johnson Grass | Bromus Tectorum | Barnyard Grass |
|---|---|---|---|---|---|---|---|---|---|---|---|---|
| I | 1 | 3 | 1 | 0 | 2 | 3 | 3 | 0 | 0 | 1 | 1 | 1 |
| II | 1 | 3 | 0 | 0 | 1 | 3 | 3 | 0 | 1 | 0 | 1 | 1 |
| III | 1 | 2 | 3 | 3 | 1 | 2 | 1 | 0 | 3 | 3 | 0 | 0 |
| IV | 1 | 0 | 0 | 0 | 1 | 3 | — | 0 | 0 | 0 | 0 | 1 |
| V | 1 | 1 | 0 | 0 | 3 | 2 | 2 | 1 | 2 | 0 | 2 | 1 |
| VI | 1 | 3 | 1 | 0 | 0 | 3 | 2 | 0 | 0 | 0 | 1 | 0 |
| VII | 1 | 1 | 0 | 0 | 0 | 3 | 2 | 0 | 1 | 1 | 1 | 1 |
| VIII | 1 | 1 | 2 | 3 | 1 | 3 | 0 | 1 | 0 | 0 | 1 | 2 |
| IX | 1 | 0 | 0 | 0 | 0 | 0 | 0 | 0 | 0 | 1 | 0 | 0 |
| X | 1 | 0 | 0 | 3 | 2 | 3 | 2 | 1 | 0 | 0 | 0 | 2 |
| XI | 1 | 1 | 3 | 0 | 0 | 2 | 1 | 0 | 0 | 0 | 0 | 1 |
| XII | 1 | 0 | 0 | 2 | 0 | 3 | 3 | 0 | 1 | 0 | 0 | 3 |
| XIII | 1 | 0 | 1 | 2 | 3 | 2 | 3 | 0 | 1 | 0 | 2 | 3 |
| XIV | 1 | 1 | 0 | 0 | 1 | 3 | — | 1 | 1 | 0 | 0 | 1 |

* The compounds are those previously given in the preparative examples.

TABLE II

| Compound | Conc lb/Acre | Canada Thistle | Cocklebur | Velvet Leaf | Morning Glory | Lambs-quarter | Smart Weed | Nutsedge | Quack-grass | Johnson-grass | Bromus Tectorum | Barnyard Grass |
|---|---|---|---|---|---|---|---|---|---|---|---|---|
| I | 4 | 4 | 3 | 0 | 3 | 4 | 4 | 0 | 2 | — | 1 | 2 |
| II | 4 | 4 | 0 | 0 | 0 | 3 | 1 | 0 | 0 | 0 | 1 | 1 |
| III | 4 | 2 | 4 | 1 | 4 | — | — | 0 | 2 | 0 | 1 | 2 |
| IV | 4 | 0 | 1 | 0 | 2 | 3 | 2 | 0 | 3 | 0 | 1 | 0 |
| V | 4 | 3 | 3 | 1 | 3 | 4 | 4 | 1 | 1 | 2 | 3 | 3 |
| VI | 4 | 4 | 3 | 4 | 4 | 4 | 3 | 1 | 1 | 0 | 1 | 2 |
| VII | 4 | 3 | 3 | 0 | 3 | — | 0 | 0 | 0 | 1 | 1 | 3 |
| VIII | 4 | — | 4 | 4 | 4 | 4 | 4 | 0 | 1 | — | 3 | 3 |
| IX | 4 | 2 | 3 | 1 | 2 | 2 | — | 0 | 0 | 1 | 0 | 1 |
| X | 4 | — | 4 | 3 | 3 | 4 | — | 0 | 2 | 2 | 1 | 3 |
| XI | 4 | 4 | 3 | 2 | 2 | 4 | — | 0 | 1 | 0 | 3 | 2 |
| XII | 4 | 3 | 4 | 3 | 3 | 3 | 3 | 1 | 1 | — | 2 | 2 |
| XIII | 4 | 3 | 4 | 4 | 3 | 3 | — | 1 | 0 | 1 | 3 | 2 |
| XIV | 4 | 1 | 3 | 3 | 3 | 3 | 3 | 1 | 1 | 1 | 2 | 2 |

* The compounds are those previously given in the preparative examples.

For the sake of brevity and simplicity, the term "active ingredient" is used hereinafter in this specification to describe the N-(1-cycloalken-1-yl)-amino-s-triazine compositions of this invention.

In practicing the herbicidal methods of this invention, the active ingredients can be used alone or in combination with a material referred to in the art as an adjuvant in liquid or solid form. Herbicidal formulations are prepared by admixing the ingredient with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of active ingredient.

Typical finely-divided solid carriers and inert solid extenders which can be used with the active ingredients include for example, the talcs, natural and synthetic clays (e.g. kaolinites and attapulgite), pumice, silica, synthetic calcium and magnesium silicates, diatomaceous earth, quartz, Fuller's earth, salt, sulfur, powdered cork, powdered wood, ground corn cobs, walnut flour, chalk, tobacco dust, charcoal, volcanic ash, cottonseed hulls, wheat flour, soybean flour, tripoli and the like. Typical liquid diluents include for example; petroleum fractions such as kerosene, hexane, xylene, benzene, Diesel Oil, toluene, acetone, ethylene dichloride, Stoddard solvent, alcohols such as propanol, glycols and the like.

Herbicidal formulations, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

Specific surface-active agents which can be used in the herbicidal formulations of this invention are set out, for example, in Searle U.S. Pat. No. 2,426,417, Todd U.S. Pat. No. 2,655,447, Jones U.S. Pat. No. 2,412,510 and Lenher U.S. Pat. No. 2,139,276. A detailed list of such agents is also set forth by J. W. McCutcheon in "Soap and Chemical Specialties", November 1947, page 8011 et seq., entitled "Synthetic Detergents"; "Detergents and Emulsifiers - Up to Date" (1960), by J. W. McCutcheon, Inc., and Bulletin E-607 of the Bureau of Entomology and Plant Quarantine of the U.S.-D.A. In general, less than 50 parts by weight of the surface active agent is present per 100 parts by weight of phytotoxic formulation.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenyl) and polyoxyethylene derivatives of the mono-higher fatter esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalene- sulfonate and sodium N-methyl-N-(long chain acid) taurates.

Wettable powder formulations usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total formulation. Where required from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate formulations which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely divided solid extender for the dusts can be either of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oil formulations are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil formulations generally contain from about 5 to 95 parts active ingredient, about 1 to 50 parts furface active agent and about 4 to 94 parts solvent, all parts being by weight based on the total weight of the emulsifiable oil.

Granules are physically stable particulate formulations comprising active ingredient adhering to or distributed through a basic matrix or an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the herbicidal formulations.

The mineral particles which are used in the herbicidal formulations usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred to use in the herbicidal formulations. The term "mesh" as used herein means U.S. Sieve Series.

The granular herbicidal formulations generally contain from about 5 parts to about 30 parts by weight of active ingredient per 100 parts by weight of clay and 0 to about 5 parts by weight of surface active agent per 100 parts by weight of particulate clay. The preferred granular formulations contain from about 10 parts to about 25 parts by weight of active ingredient per 100 parts by weight of clay.

The plant growth regulant compositions of this invention can also contain other additaments, for example fertilizers, phytotoxicants, other plant growth regulants, pesticides and the like used as adjuvant or in combination with any of the abovedescribed adjuvants. Chemicals useful in combination with the active ingredients of this invention include for example, ureas, carbamates, acetamides, acetanilides, uracils, acetic acids, phenols,, thiolcarbamates, triazoles, benzoic acids, nitriles and the like such as:

3-amino-2,5-dichlorobenzoic acid
3-amino-1,2,4-triazole
2-chloro-N,N-diallylacetamide
2-chloroallyl diethyldithiocarbamate
N'-(4-chlorophenoxy) phenyl-N,N-dimethylurea
isopropyl M-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
6,7-dihydrodipyrido(1,2-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2,4-dichlorophenyl-4-nitrophenyl ether
$\alpha,\alpha,\alpha$-trifluoro-2,6-dinitro-N,N-dipropyl-p-toluidine
S-propyl dipropylthiolcarbamate
2,4-dichlorophenoxyacetic acid
2',6'-diethyl-N-methoxymethyl-2-chloroacetanililde Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the active ingredients are dispersed in or on soil or plant growth media and/or applied to above ground portions of plants in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The application of an effective amount of the active ingredients of this invention to the soil or growth media and/or plant is very important for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.1 to about 25 or more pounds per acre. In such soil applications, it is desirable that the active ingredients be distributed to a depth of at least 0.2 inches. In selective pre-emergence herbicidal applications the active ingredients are usually applied in amounts from about 0.1 to 25 pounds per acre but preferably from about 0.1 to 10 pounds per acre. It is believed that one skilled in the art can readily determine from the teachings of this specification, including examples, the general procedure for any application.

In summary, in general the active ingredients may be formulated with the active ingredient in minor or major proportions in accordance with the table below:

| Type of Formulation | Concentration of Active Ingredient |
| --- | --- |
| 1. Granules of relatively large particle size | 5 to 50% |
| 2. Powdery dusts | 2 to 90% |
| 3. Wettable powders | 2 to 90% |
| 4. Emulsifiable concentrates | 5 to 95% |
| 5. Solutions | .01 to 95% |
| 6. One of the less common types of formulations depending on the desired mode of application | .01 to 95% |

Having now described the invention, many ramifications and modified embodiments will readily occur to those skilled in the art. In so far as such variations does not depart from the spirit and scope of the invention described in this application, they are intended to be embraced by the appended claims in their broadest construction.

What is claimed is:

1. Herbicidal method which comprises applying a herbicidal amount of a composition comprising at least one herbicidal adjuvant and at least one compound of the formula

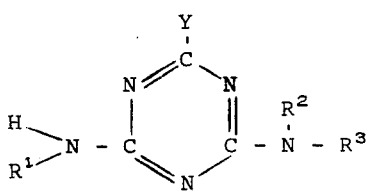

wherein Y is chloro, alkoxy or alkylthio containing up to 4 carbon atoms, $R^1$ is alkyl or alkoxyalkyl containing a maximum of 8 carbon atoms, $R^2$ is alkyl containing a maximum of 8 carbon atoms provided that the sum of the carbon atoms in the groups represented by $R^1$ and $R^2$ is at least 4, and $R^3$ is a 1-cyclopenten-1-yl, a 1-cyclohexen-1-yl, a 1-cyclohepten-1-yl or a lower alkyl or lower alkoxy substituted 1-cyclopenten-1-yl, 1-cyclohexen-1-yl or 1-cyclohepten-1-yl group.

2. Herbicidal method according to claim 1 wherein Y is methylthio and $R^3$ is a 1-cyclohexen-1-yl group.

3. Herbicidal method according to claim 1 wherein Y is chlorine and $R^3$ is a 1-cyclohexen-1-yl group.

4. Herbicidal method according to claim 1 wherein Y is methoxy and $R^3$ is a 1-cyclohexen-1-yl group.

5. Herbicidal method according to claim 2 wherein $R^1$ is isopropyl and $R^2$ is ethyl.

6. Herbicidal method according to claim 3 wherein $R^1$ is isopropyl and $R^2$ is ethyl.

7. Herbicidal method according to claim 4 wherein $R^1$ is isopropyl and $R^2$ is ethyl.

8. Herbicidal method according to claim 1 wherein said compound is 2-(isopropylamino)-4-(N-methyl-N-(1-cyclohexen-1-yl))amino-6-methylthio-s-triazine.

9. Herbicidal method according to claim 1 wherein said compound is 2-(isopropyl)-4-(N-ethyl-N-(cyclohexen-1-yl))-amino-6-methylthio-s-triazine.

10. Herbicidal method according to claim 1 wherein said compound is 2-(t-butyl)-4-(N-ethyl-N-(1-cyclohexen-1-yl))-amino-6-chloro-s-triazine.

11. Herbicidal composition comprising at least one adjuvant and a herbicidally effective amount of at least one compound of the formula

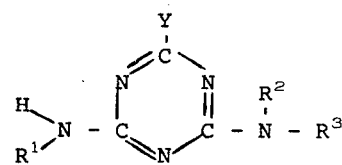

wherein Y is chloro, alkoxy or alkylthio containing up to 4 carbon atoms, $R^1$ is alkyl or alkoxyalkyl containing a maximum of 8 carbon atoms, $R^2$ is alkyl containing a maximum of 8 carbon atoms provided that the sum of the carbon atoms in the groups represented by $R^1$ and $R^2$ is at least 4, and $R^3$ is a 1-cyclopenten-1-yl, a 1-cyclohexen-1-yl, a 1-cyclohepten-1-yl or a lower alkyl or lower alkoxy substituted 1-cyclopenten-1-yl, 1-cyclohexen-1-yl or 1-cyclohepten-1-yl group.

12. Herbicidal composition of claim 11 wherein Y is methylthio and $R^3$ is a 1-cyclohexen-1-yl group.

13. Herbicidal composition of claim 11 wherein Y is chloro and $R^3$ is a 1-cyclohexen-1-yl group.

14. Herbicidal composition of claim 11 wherein Y is methoxy and $R^3$ is a 1-cyclohexen-1-yl group.

15. Composition of claim 12 wherein $R^1$ is isopropyl and $R^2$ is ethyl.

16. Composition of claim 12 wherein $R^1$ is isopropyl and $R^2$ is methyl.

17. Composition of claim 13 wherein $R^1$ is t-butyl and $R^2$ is ethyl.

18. Composition of claim 13 wherein $R^1$ is isopropyl and $R^2$ is methyl.

19. Composition of claim 14 wherein $R^1$ is isopropyl and $R^2$ is methyl.

20. Composition of claim 14 wherein $R^1$ is isopropyl and $R^2$ is ethyl.

21. Composition of claim 14 wherein $R^1$ is t-butyl and $R^2$ is ethyl.

22. Herbicidal method according to claim 1 wherein the composition is applied to plants.

23. Herbicidal method according to claim 1 wherein said composition is applied to the growth media.

* * * * *